(12) United States Patent
Commons et al.

(10) Patent No.: US 11,381,958 B2
(45) Date of Patent: Jul. 5, 2022

(54) REMOTE SYSTEM CONFIGURATION USING AUDIO PORTS

(71) Applicant: D&M HOLDINGS INC., Kanagawa (JP)

(72) Inventors: Christopher Commons, Carmel, IN (US); Peter Thoeming, San Diego, CA (US)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 14/906,918

(22) PCT Filed: Jul. 23, 2013

(86) PCT No.: PCT/IB2013/002812
§ 371 (c)(1),
(2) Date: Jan. 22, 2016

(87) PCT Pub. No.: WO2015/011520
PCT Pub. Date: Jan. 29, 2015

(65) Prior Publication Data
US 2016/0165645 A1     Jun. 9, 2016

(51) Int. Cl.
*H04M 3/00*     (2006.01)
*H04W 8/22*     (2009.01)
(Continued)

(52) U.S. Cl.
CPC ............... *H04W 8/22* (2013.01); *G06F 3/16* (2013.01); *H04W 8/24* (2013.01); *H04W 48/08* (2013.01);
(Continued)

(58) Field of Classification Search
CPC ... H04W 4/008; H04W 76/023; H04W 8/005; H04W 4/18; H04W 48/00; H04W 12/02; H04W 24/00
(Continued)

(56) References Cited

U.S. PATENT DOCUMENTS

| | | | | |
|---|---|---|---|---|
| 6,424,820 B1 * | 7/2002 | Burdick | ............... | H04B 5/0081 |
| | | | | 455/132 |
| 2002/0030871 A1 * | 3/2002 | Anderson | ............. | H04B 1/385 |
| | | | | 398/132 |

(Continued)

FOREIGN PATENT DOCUMENTS

| | | |
|---|---|---|
| CN | 1976308 | 6/2007 |
| CN | 102932543 | 2/2013 |

(Continued)

OTHER PUBLICATIONS

CN 202889567U Translation Bluetooth System and bluetooth earphones, Feb. 3, 2021.*

(Continued)

*Primary Examiner* — Joseph Arevalo
(74) *Attorney, Agent, or Firm* — Sheehan Phinney Bass & Green PA

(57) ABSTRACT

Described herein are methods and devices for configuring a wireless device using audio data that is transmitted from a mobile device to the wireless device via a wired connection. For example, wireless configuration data may be sent from an audio port of the mobile device to an audio port of the wireless device while the mobile device and the wireless device are temporarily connected via an audio cable. According to an example method, a mobile device may determine wireless configuration data associated with a wireless local area network. The mobile device may then send the wireless configuration data to a wireless device via an audio port of the mobile device, such that the wireless device may be configured to access the wireless local area network.

18 Claims, 11 Drawing Sheets

(51) Int. Cl.
  *H04W 48/08* (2009.01)
  *H04W 84/12* (2009.01)
  *H04W 8/24* (2009.01)
  *H04W 76/10* (2018.01)
  *G06F 3/16* (2006.01)

(52) U.S. Cl.
  CPC ........... *H04W 76/10* (2018.02); *H04W 84/12* (2013.01); *H04R 2420/07* (2013.01)

(58) Field of Classification Search
  USPC ......... 455/420, 418, 66.1, 41.2, 550.1, 41.3, 455/130, 556.1, 90.3, 466, 458, 424, 455/426.1, 456.1, 343.1, 323, 41.1, 132, 455/151.2; 370/255
  See application file for complete search history.

(56) References Cited

U.S. PATENT DOCUMENTS

| | | | |
|---|---|---|---|
| 2003/0092395 A1 | 5/2003 | Gassho et al. | |
| 2005/0148326 A1 | 7/2005 | Nogawa et al. | |
| 2005/0228980 A1* | 10/2005 | Brokish | G06F 21/575 713/2 |
| 2005/0273790 A1* | 12/2005 | Kearney, III | H04L 12/66 719/328 |
| 2006/0068910 A1* | 3/2006 | Schmidt | A63F 13/10 709/203 |
| 2006/6246941 | 11/2006 | Watanabe | |
| 2007/0123251 A1* | 5/2007 | McElvaney | H04M 1/2535 455/426.1 |
| 2007/0192833 A1* | 8/2007 | Ho | H04W 12/06 726/3 |
| 2007/0242839 A1 | 10/2007 | Kim et al. | |
| 2007/0254588 A1* | 11/2007 | Lafuente | H04M 1/7253 455/41.2 |
| 2009/0064299 A1* | 3/2009 | Begorre | H04W 12/12 726/7 |
| 2009/0287936 A1* | 11/2009 | Ohkado | G06F 21/33 713/183 |
| 2010/0172522 A1* | 7/2010 | Mooring | H04R 1/1041 381/311 |
| 2011/0150249 A1* | 6/2011 | Klemmensen | H04R 1/1008 381/312 |
| 2011/0235549 A1* | 9/2011 | Ahlers | H04L 41/08 370/255 |
| 2012/0008052 A1* | 1/2012 | Funabiki | H04N 21/43637 348/723 |
| 2012/0079123 A1* | 3/2012 | Brown | H04M 1/72412 709/228 |
| 2012/0120212 A1* | 5/2012 | Mao | H04N 13/341 348/56 |
| 2012/0214416 A1* | 8/2012 | Kent | H04L 63/18 455/41.2 |
| 2012/0252367 A1* | 10/2012 | Gaglio | G10L 13/00 455/66.1 |
| 2013/0129126 A1* | 5/2013 | Callias | H02J 7/345 381/315 |
| 2013/0173794 A1* | 7/2013 | Agerbak | H04W 48/18 709/225 |
| 2013/0211567 A1* | 8/2013 | Oganesyan | H04W 4/20 700/94 |
| 2013/0331034 A1* | 12/2013 | Tucker | H04M 1/6066 455/41.2 |
| 2014/0125756 A1* | 5/2014 | Hsu | G09G 3/2096 348/14.04 |
| 2014/0269951 A1* | 9/2014 | Babarskas | H04B 3/542 375/257 |
| 2014/0270284 A1* | 9/2014 | Luna | H04R 27/00 381/303 |
| 2014/0334644 A1* | 11/2014 | Selig | G06F 3/165 381/108 |
| 2015/0110315 A1* | 4/2015 | Callias | H04R 25/554 381/315 |
| 2015/0188982 A1* | 7/2015 | Punnakkal | H04L 67/025 709/203 |
| 2015/0195642 A1* | 7/2015 | Saideh | H04R 1/1033 381/74 |
| 2015/0229475 A1* | 8/2015 | Benoit | H04L 63/061 713/168 |
| 2015/0301513 A1* | 10/2015 | Sager | H04N 7/181 700/90 |
| 2016/0021475 A1* | 1/2016 | Moore | G01H 3/00 381/58 |
| 2016/0117463 A1* | 4/2016 | Nemiroski | G06F 19/3418 340/870.07 |
| 2016/0127179 A1* | 5/2016 | Frankel | G06F 9/00 709/220 |
| 2016/0134979 A1* | 5/2016 | El-Hoiydi | H04R 25/554 381/315 |
| 2016/0165645 A1* | 6/2016 | Commons | H04W 8/24 455/420 |
| 2016/0275966 A1* | 9/2016 | Jazi | G10L 21/0208 |
| 2017/0272860 A1* | 9/2017 | Jeanne | H04R 3/12 |
| 2018/0027328 A1* | 1/2018 | Kohara | H04R 3/12 381/80 |
| 2019/0020853 A1* | 1/2019 | Segal | H04N 5/2222 |

FOREIGN PATENT DOCUMENTS

| | | |
|---|---|---|
| CN | 202889567 | 4/2013 |
| EP | 1309127 A1 | 5/2003 |
| EP | 1489502 A2 | 12/2004 |
| EP | 1793531 A1 | 6/2007 |
| JP | 2005176100 | 6/2005 |
| JP | 2011-160060 A | 8/2011 |
| WO | 200031994 A1 | 6/2000 |

OTHER PUBLICATIONS

CN 102932543B Translation device for configuring multimedia acquision devices by using multimedia, Oct. 26, 2012 Netview technologies.*

PCT International Search Report for PCT Application No. PCT/IB2013/002812, dated Apr. 30, 2014, 5 pages.

* cited by examiner

REMOTE SYSTEM CONFIGURATION USING AUDIO PORTS

CROSS-REFERENCE TO RELATED APPLICATIONS

This application is a national phase application pursuant to 35 U.S.C. 371 of International Application No. PCT/IB2013/002812, filed Jul. 23, 2013. The application is hereby incorporated by reference in its entirety.

BACKGROUND

A wireless local area network (WLAN) is a type of local area network that utilizes high-frequency radio waves rather than wires to communicate between nodes. Most WLANs are established based on IEEE 802.11 standards and marketed under the Wi-Fi brand name. By providing a connection through an access point to the wider Internet, WLANs enable users to move around within a local coverage area while still connected to the Internet. For example, many homes have wireless networking equipment such as Wi-Fi routers and access points that enable connecting wireless devices to each other and to the Internet. Similarly, many commercial complexes offer wireless Internet access to their customers by installing a WLAN.

In order for a wireless device to connect to a WLAN, the wireless device usually needs to be configured by a user. For instance, a user may utilize a video or text-based display and associated input interface of a wireless device to configure the wireless device with the name of the WLAN. If the WLAN is password-protected, the user may also specify a password of the WLAN. The wireless device may then use the name of the WLAN, and optionally the password, to wirelessly communicate with access points of the WLAN. In an instance in which multiple WLANs overlap in a certain location, the name of the WLAN may help the wireless device differentiate the WLAN over other existing WLANs and allow the wireless device to make sure that data is sent to the appropriate WLAN.

SUMMARY

Some wireless devices do not have an interface and display to facilitate configuring the wireless device for wireless communication. A solution to configuring such a wireless device involves using a mobile device that has an interface and display as a remote user interface for configuring the wireless device. While the types of connectors available for wired data communication on a mobile device are often limited to universal serial bus (USB) ports or proprietary connectors, many mobile devices have an audio port for outputting audio data that can be electrically connected to an audio port of a wireless device using an audio cable. Accordingly, described herein are methods and devices for configuring a wireless device using audio data that is transmitted from a mobile device to the wireless device via a wired connection. For example, wireless configuration data may be sent from an audio port of the mobile device to an audio port of the wireless device while the mobile device and the wireless device are temporarily connected via an audio cable. The wireless configuration data includes a unique identifier of a wireless local area network and can also include an authentication key or security password.

In one example aspect, a method is provided that involves determining, using a mobile device, wireless configuration data associated with a wireless local area network. The wireless configuration data includes a unique identifier of the wireless local area network. The method also involves sending the wireless configuration data to a wireless device via an audio port of the mobile device that is electrically connected to an audio port of the wireless device via a transmission line.

In another example aspect, a mobile device for configuring a wireless device to access a wireless local area network is provided. The mobile device comprises an audio port, at least one processor, and a computer-readable medium. The audio port is configured to electrically connect to an audio port of the wireless device via a transmission line. The computer-readable medium is configured to store instructions, that when executed by the at least one processor, cause the mobile device to perform functions. The functions include determining wireless configuration data associated with the wireless local area network. The wireless configuration data includes a unique identifier of the wireless local area network. The functions also include sending the wireless configuration data to the wireless device via the audio port of the mobile device.

In still another example aspect, a method is provided that involves determining, using a wireless device, one or more wireless local area networks that the wireless device is capable of wirelessly connecting to based on one or more wireless access points within a wireless range of the wireless device. The method also involves sending data identifying the one or more wireless local area networks to a mobile device via an audio port of the wireless device. The audio port of the wireless device is electrically connected to an audio port of the mobile device via a transmission line. The method further involves receiving, from the mobile device via the audio port of the wireless device, wireless configuration data associated with a wireless local area network of the one or more wireless local area networks. The wireless configuration data includes a unique identifier of the wireless local area network. Additionally, the method involves the wireless device connecting to the wireless local area network using the wireless configuration data.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
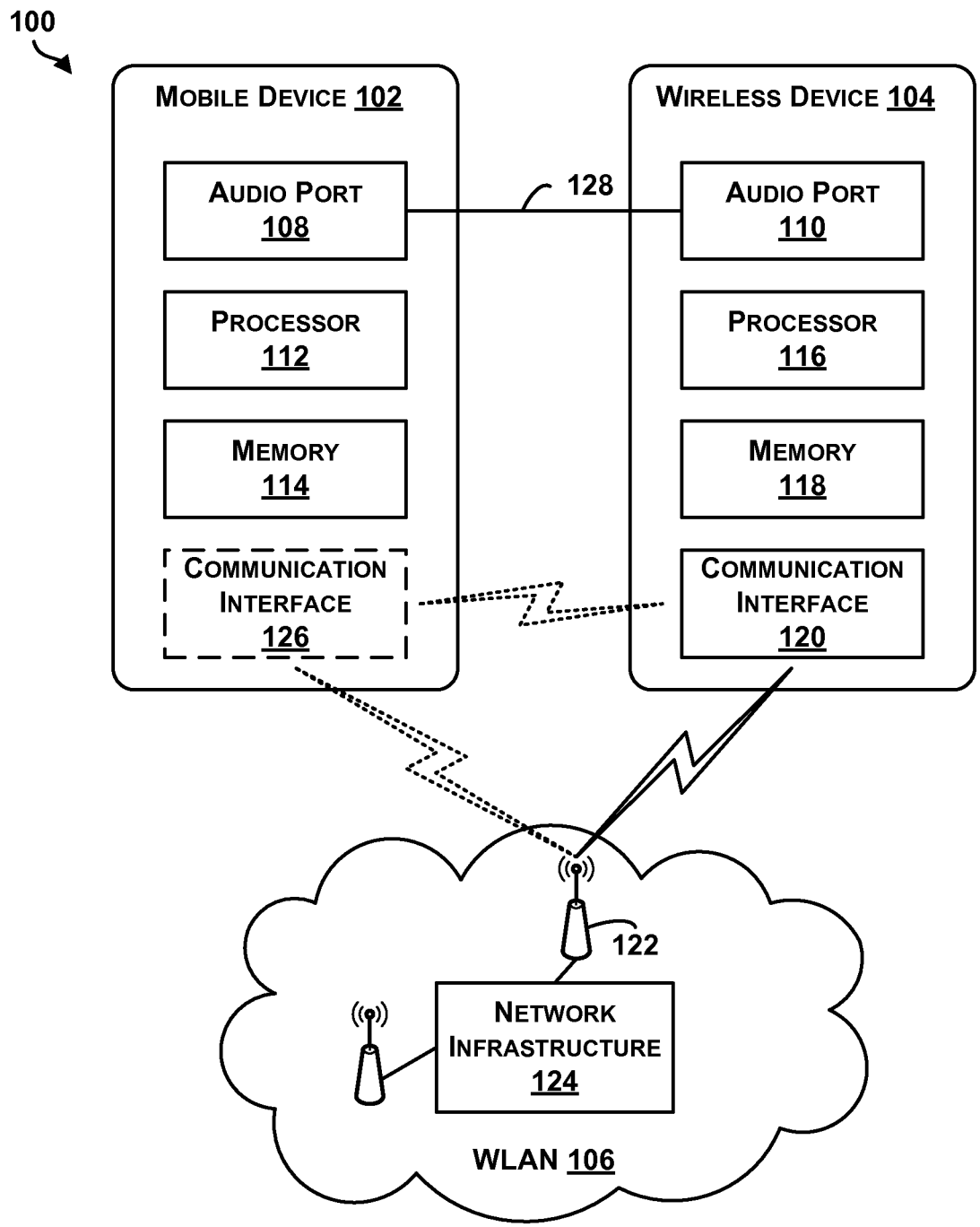
FIG. 1 illustrates an example system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and devices for configuring a wireless device using audio data that is transmitted from a mobile device to the wireless device via a wired connection. For example, wireless configuration data may be sent from an audio port of the mobile device to an audio port of the wireless device while the mobile device and the wireless device are temporarily connected via an audio cable.

According to an example method, a user may temporarily electrically connect an audio port of a mobile device to an audio port of a wireless device using an audio cable. The mobile device may determine wireless configuration data for a wireless local area network. For instance, the mobile device may determine a unique identifier of the wireless local area network (e.g., a network name) and optionally an authentication key (e.g., a password) associated with the wireless local area network. The mobile device may then send the wireless configuration data to the wireless device via the audio cable, such that the wireless device may wirelessly connect to the wireless local area network using the wireless configuration data. In a further example, the wireless device may also provide a configuration status to the mobile device via the audio cable. However, the audio cable need not be a two-way communication link, and the example is not meant to be limiting.

In one example, an application operating on the mobile device may prompt a user to input the wireless configuration data. For instance, a user may be prompted to specify the network name of a wireless local area network for the wireless device to access or prompt the user to input a password for a wireless local area network that the mobile device is currently wirelessly connected to. In another example, a user may use an application operating on the mobile device to select a wireless local area network for the wireless device to access from among one or more available wireless local area networks identified by the mobile device or the wireless device.

Advantageously, in one embodiment, the method may be implemented by a mobile phone or tablet to configure a wireless speaker to access a WLAN. The method may be implemented when, for example, the wireless speaker is installed in a different location than a location where a wireless access point of a WLAN is located, such that the wireless speaker cannot easily be connected to the wireless access point via a wired connection.

Additionally, the method may be implemented by any type of mobile computing device to configure any type of wireless device for wireless communication. Although portions of this disclosure are described with respect to configuring a wireless device to access wireless access points of a WLAN, the examples are not meant to be limiting. This disclosure may also be applicable to configuring a wireless device to wireless communicate in a peer to peer (P2P) WLAN (e.g., an ad-hoc network or Wi-Fi Direct network in which wireless devices communicate directly without the use of any wireless access points). Additional functionalities and examples of the devices and methods are also described hereinafter with reference to the accompanying figures.

Referring now to the figures, FIG. 1 illustrates an example system 100. As shown in FIG. 1, the example system 100 includes a mobile device 102 that may be used to configure a wireless device 104 for accessing a WLAN 106. As described above, the mobile device 102 may represent any type of mobile computing device having a display interface and an audio port 108. The audio port 108 may be any type of port configured for outputting audio data. Optionally, the audio port 108 may also be configured to receive audio data. By way of example, the mobile device 102 may be a mobile phone having a phone jack for outputting audio data (e.g., a 2.5 mm, 3.5 mm, or 6.35 mm socket for outputting audio data to headphones, earphones, a headset, etc.). However, the example is not meant to be limiting. In other instances, the mobile device 100 may be a laptop computer, tablet, wearable computing device, or other type of computing device.

The wireless device 104 may represent any type of computing device that has an audio port 110 and may be configured to access a WLAN. The audio port 110 may be any type of port configured to receive audio data. Optionally, the audio port 110 may also be configured to output audio data. By way of example, the wireless device 104 may be a wireless speaker configured to transmit and/or receive audio signals using radio frequency waves rather than audio cables. For instance, the wireless device 104 may be a wireless speaker having an audio input jack for playing an external audio source through the wireless speaker. Again however, the example is not meant to be limiting. In other instances, the wireless device may be a display device, an appliance, or other type of electronic device.

In some instances, the wireless device 104 may not include a display and input interface for providing wireless configuration data. In other instances, the wireless device 104 may include a display and input interface, but the display and input interface may be difficult to use. Thus, a user may opt to configure the wireless device 104 using the mobile device 102 as a remote user interface.

The mobile device 102 may further include a processor 112 and a memory 114. Similarly, the wireless device 104 may also include a processor 116 and a memory 118. The processor 112 and the processor 116 may be any type of processors, such as a microprocessor, digital signal processor, multicore processor, etc., coupled to the memory 114 and memory 118 respectively. The memory 114 and the memory 118 may be any type of memories, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the wireless device 104 may include a communication interface 120 that is configured to facilitate wireless data communication for the wireless device 104 according to one or more wireless communication standards. For example, the communication interface 120 may be a Wi-Fi communication component that is configured to facilitate wireless data communication with the wireless local area network 106 according to one or more IEEE 802.11 standards. As another example, the communication interface 120 may be a Bluetooth communication component that is configured to facilitate wireless data communication according to one or more Bluetooth standards. Other examples are also possible.

As described herein, the communication interface 120 may be configured to wirelessly communicate with an access point 122 of the WLAN 106 using wireless configuration data that is received from the mobile device 102. The WLAN 106 may include one or more access points, such as the access point 122. Each of the access points may be a device that allows wireless devices to connect to a wired network (e.g. the Internet) using Wi-Fi or related standards. The access points may be connected to a router, or may be components of a router. The WLAN 106 may also include network infrastructure 124. Network infrastructure may include one or more components that facilitate connecting the WLAN to a wired network (e.g., the Internet). By way of the example, the network infrastructure 124 may include one or more routers, WLAN controllers, network bridges, modems and/or other networking components.

In another example, the WLAN may not include any wireless access points (not shown). For example, the communication interface 120 may be configured to wirelessly communicate with another wireless device or the mobile device 102 (e.g., in a P2P WLAN).

Additionally, the mobile device 102 may optionally include a communication interface 126. The communication interface 126 may be similar to the communication interface 120. For example, the communication interface 126 may be a Wi-Fi communication component that is configured to facilitate wireless data communication with the wireless local area network 106 and/or the wireless device 104 according to one or more IEEE 802.11 standards. Alternatively, the communication interface 126 may be a Bluetooth communication component.

As described briefly above, the mobile device 102 may be used as a remote user interface for configuring the wireless device 104 to access a WLAN. For example, the mobile device 102 may be configured to determine wireless configuration data and send the wireless configuration data to the wireless device 104 via a transmission line 128. As shown in FIG. 1, the transmission line 128 may electrically connect the audio port 108 and the audio port 110. By way of example, the transmission line 128 may be any type of digital or analog audio cable. For instance, the transmission line 128 may be a phone connector often referred to as a mini-stereo cable.

Figure 2:
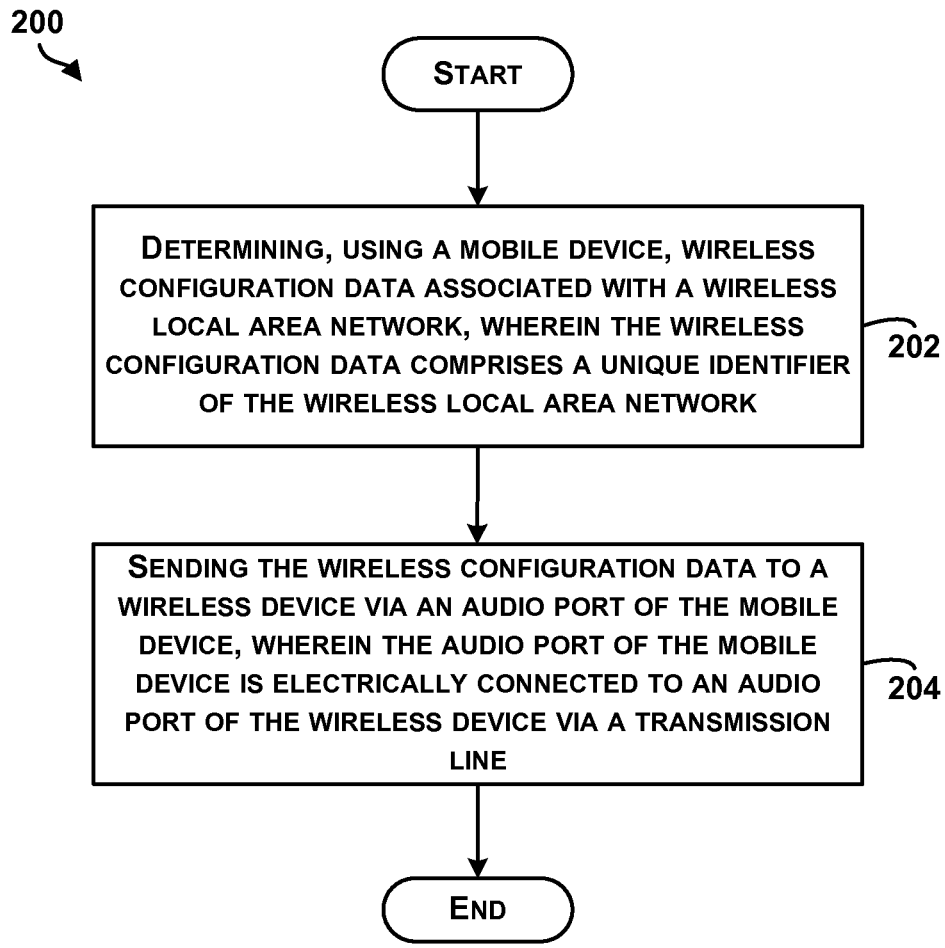
FIG. 2 is a block diagram of an example method for configuring a wireless device.

Turning now to FIG. 2, FIG. 2 is a block diagram of an example method 200 for configuring a wireless device. Method 200 shown in FIG. 2 presents an embodiment of a method that could be used or implemented by the mobile device 102 of FIG. 1, for example, or by components of the mobile device 102 of FIG. 1, or more generally by any computing device. Method 200 may include one or more operations, functions, or actions as illustrated by one or more of blocks 202-204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

In some examples, the method 200 may be carried out when an audio port of a mobile device is electrically connected to an audio port of a wireless device. However, in some examples, block 202 may be performed prior to connecting the audio port of the mobile device to the audio port of the wireless device.

Initially, at block 202, the method 200 includes determining, using a mobile device, wireless configuration data associated with a wireless local area network. The wireless configuration data may include a unique identifier of the wireless local area network. For example, the unique identifier may be a service set identifier (SSID) of the wireless local area network, commonly referred to as a network name. Thus, the unique identifier may be an alphanumeric sequence that differences the particular WLAN over other WLANs. In some examples, the wireless configuration data may also include an authentication key for encrypted data transmission between the wireless device and the wireless local area network. For example, the authentication key may be a Wired Equivalent Privacy (WEP) key, Wi-Fi Protected Access (WPA) key, WPA2 key, etc.

The mobile device may determine the wireless configuration data in a variety of ways. As one example, the mobile device may prompt a user to provide the unique identifier, and optionally an authentication key, via an interface of the mobile device. For instance, a user may use an application operating on the mobile device to specify the unique identifier and authentication key. In response to a user entering a unique identifier or authentication key, the mobile device may receive data identifying the unique identifier or authentication key. As another example, a mobile device may prompt a user to select a unique identifier from among a plurality of unique identifiers that are associated with different WLANs. As still another example, the mobile device may determine the wireless configuration data based on the WLAN that the mobile device is wirelessly connected to.

Further explanation of each of the example scenarios is further described below with reference to FIGS. 3A-5.

At block 204, the method 200 includes sending the wireless configuration data to a wireless device via an audio port of the mobile device. The audio port of the mobile device may be temporarily electrically connected to an audio port of the wireless device via a transmission line. In one example, the mobile device may be configured to send the wireless configuration data to the wireless device using frequency shift keying (FSK). However, any type of analog or digital modulation scheme may be employed by the mobile device.

In some instances, the method 200 may further include receiving a configuration status of the wireless device via the transmission line. For example, if the audio port of the mobile device also supports a microphone input (e.g., in the case of a three-conductor or four-conductor audio socket), the wireless device may send audio data that is indicative of the configuration status to the mobile device via the transmission line. The mobile device may then provide a visual indication of the configuration status for display. For instance, the configuration status may be a notification that indicates whether the wireless device is wirelessly connected to the WLAN. If the wireless device was unable to connect to the WLAN, the configuration status may be an error message that indicates a cause of the failure. As an example, the error message may indicate that the WLAN is out of range or the wireless configuration data is incorrect.

FIGS. 3A-3D are conceptual illustrations of example functions that may be performed by a mobile device 302. For example, FIGS. 3A-3D conceptually illustrate functions that may be performed by a mobile device that is configured to execute the method 200 of FIG. 2. In FIGS. 3A-3D, the mobile device 302 is shown electrically connected to a wireless device 304 via an audio cable 306.

In one example, a user may temporarily electrically connect an audio port of the mobile device 302 to an audio port of the wireless device 304 using the audio cable 306. To begin a configuration process, the user may press a button on the wireless device 304. Pressing the button may cause the wireless device 304 to enter a configuration mode. In another example, the wireless device 304 may be configured to automatically enter a configuration mode in response to receiving a particular command via the audio port of the wireless device. Therefore, in some instances, a user may not be required to press a button on the wireless device 304. Optionally, the wireless device 304 may provide an audible or visual indication that the wireless device 304 has entered a configuration mode (e.g., by illuminating an LED or playing a beep/tone).

Figure 3A:
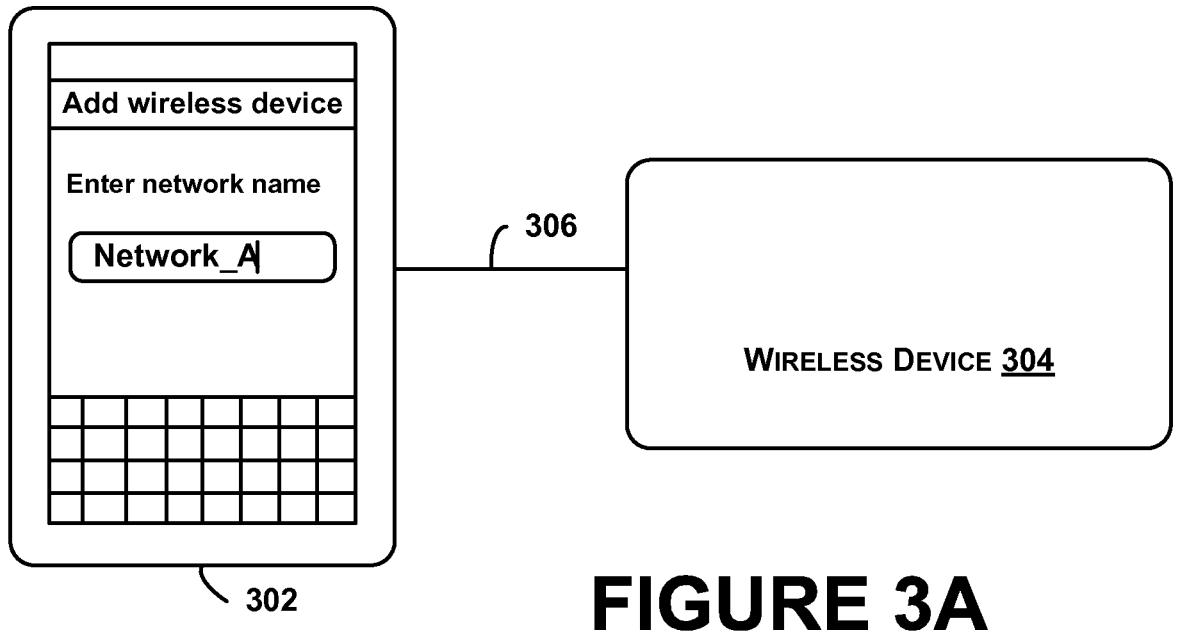
FIGS. 3A-3D are conceptual illustrations of example functions that may be performed by a mobile device.

Once the wireless device 304 has entered a configuration mode, a user may provide wireless configuration data via an interface of the mobile device 302. As shown in FIG. 3A, the mobile device 302 may prompt a user to enter a name of the WLAN which the user would like to configure the wireless device 304 to access. A user may then input a unique identifier of the network. In one instance, the mobile device 302 may determine that the WLAN identified by the user is password-protected, and responsively also prompt a user to input an authentication key associated with the WLAN (not shown).

Figure 3B:
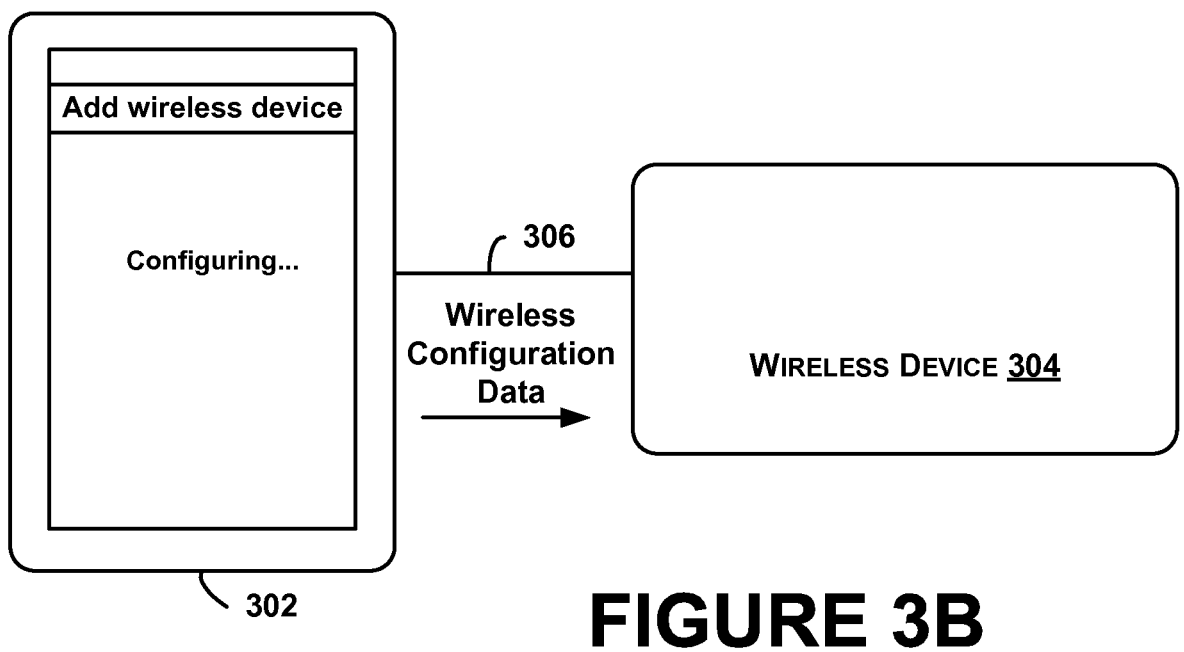

As shown in FIG. 3B, the mobile device 302 may send wireless configuration data to the wireless device 304 such that the wireless device may wirelessly connect to the WLAN identified by the user. In one example, a user may provide an input via an interface of the mobile device 302 that triggers the mobile device to send the wireless configuration data to the wireless device 304. For example, a user may select a virtual button or otherwise indicate a request to configure the wireless device 304.

Figure 3C:
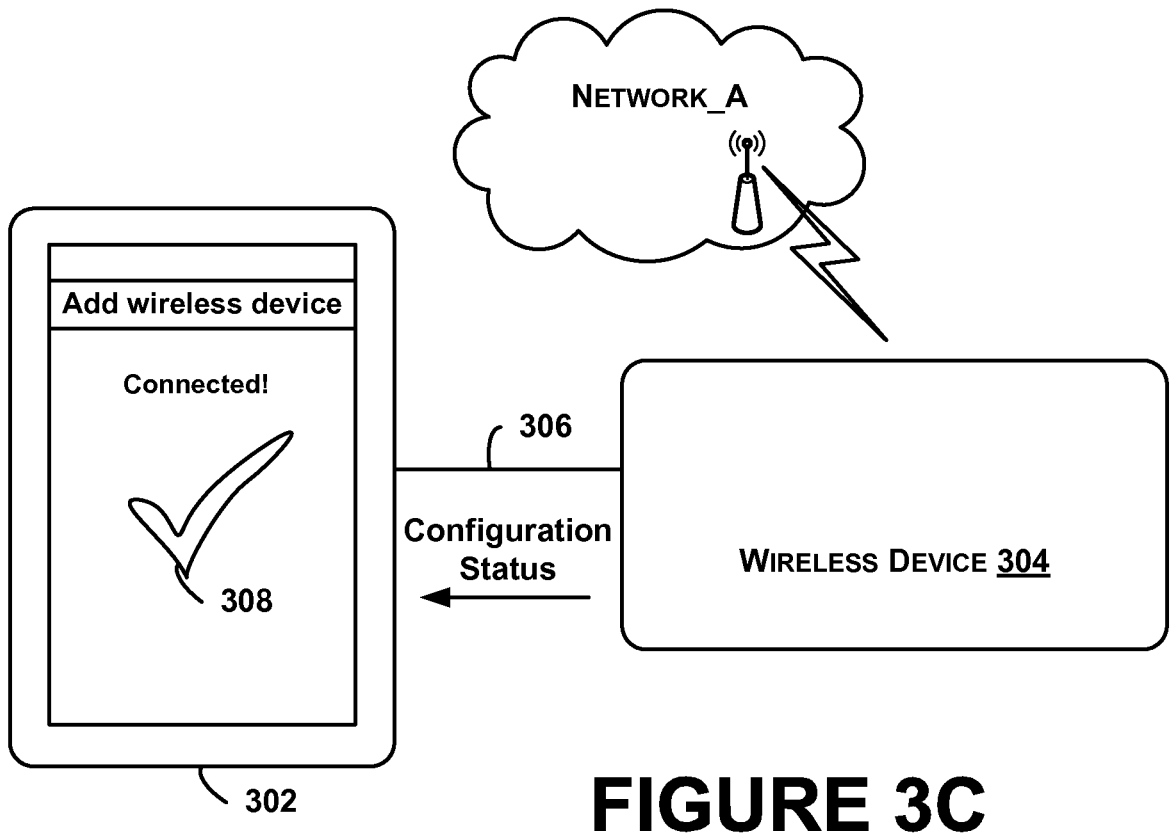
Figure 3D:
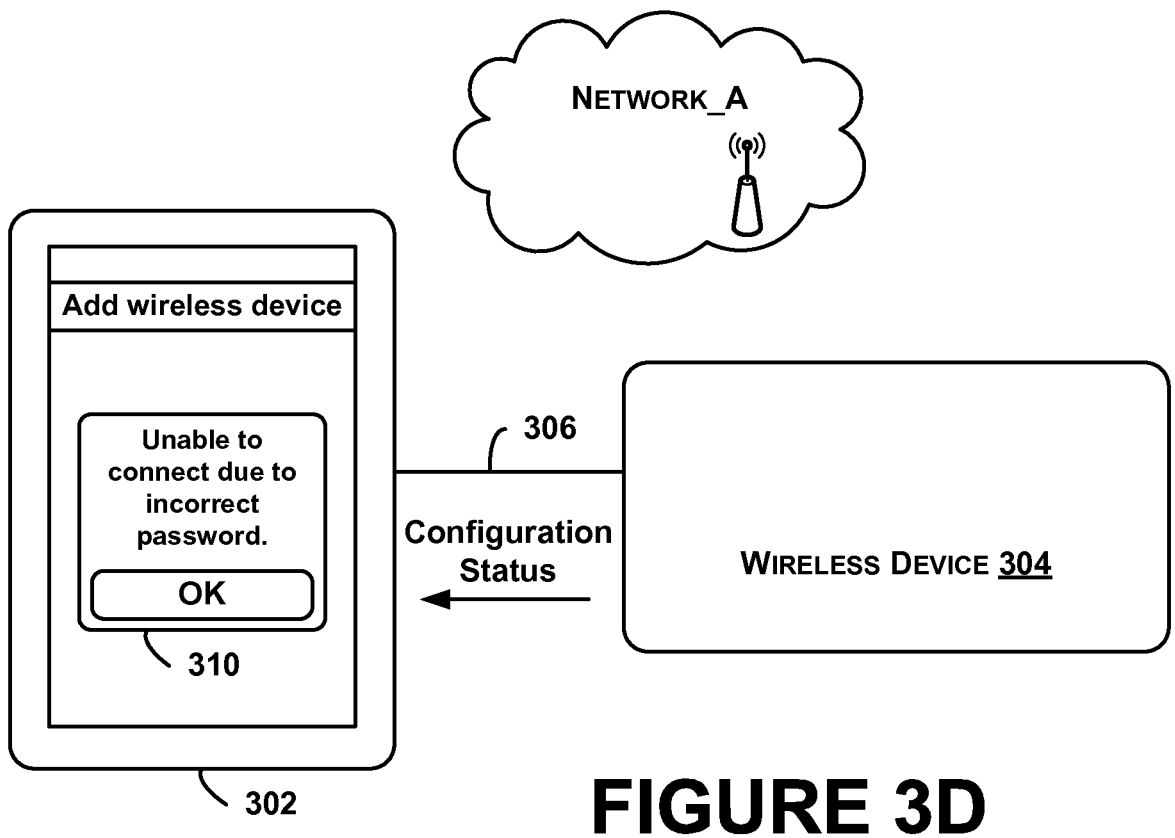

Upon receiving the wireless configuration data and wirelessly connecting to the WLAN, the wireless device 304 may send a configuration status to the mobile device 302. As shown in FIG. 3C, if the configuration status is indicative that the wireless device was successfully able to connect to the WLAN, the mobile device 302 may provide a visual indication 308 that the wireless device 304 is connected to the WLAN. As shown in FIG. 3D, if the configuration status is indicative that the wireless device 304 was unable to wirelessly connect to the WLAN, the mobile device 302 may provide an error message 310. The error message 310 may indicate why the wireless device 304 was unable to connect to the WLAN, for instance.

Figure 4A:
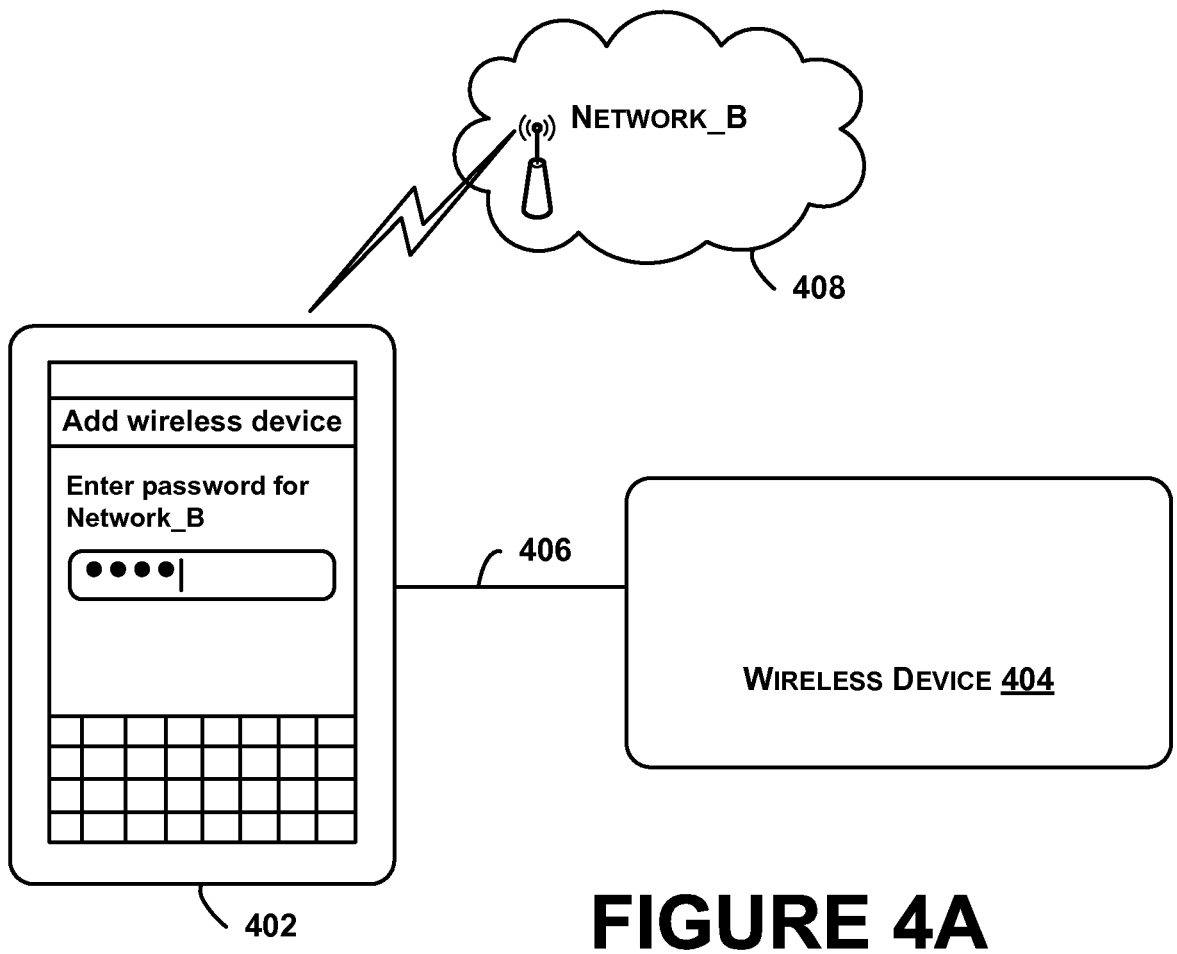
FIGS. 4A and 4B are conceptual illustrations of additional example functions that may be performed by a mobile device.
Figure 4B:
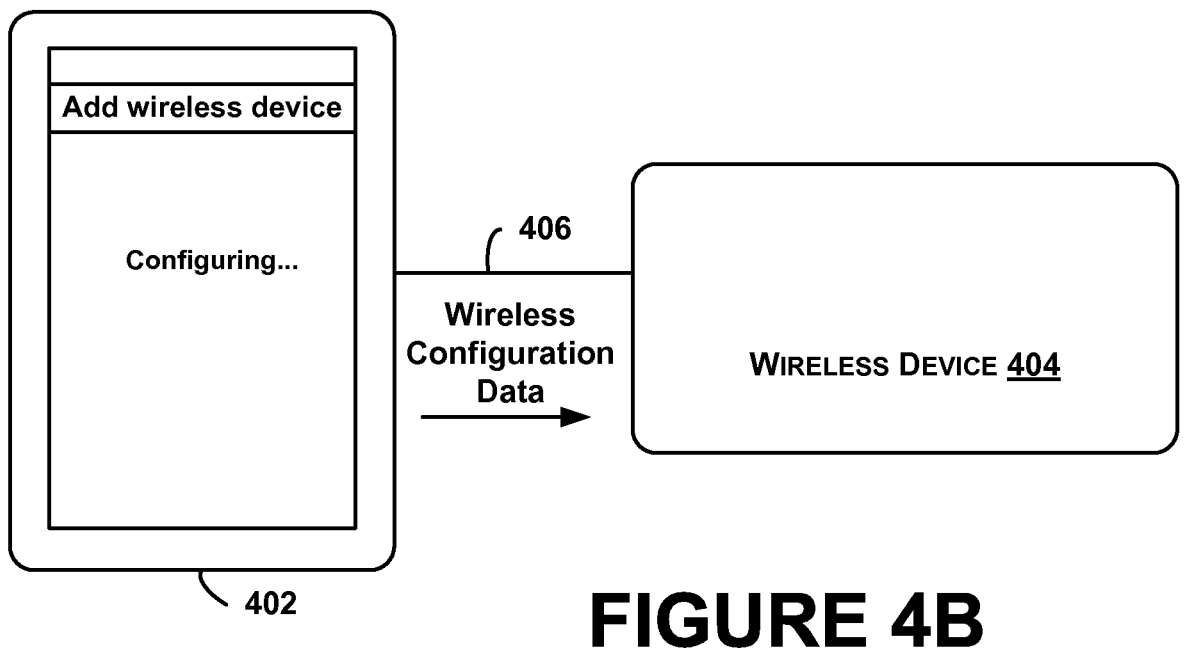

FIGS. 4A and 4B are conceptual illustrations of additional example functions that may be performed by a mobile device 402. In FIGS. 4A and 4B, the mobile device 402 is shown electrically connected to a wireless device 404 via an audio cable 406. As shown in FIG. 4A, the mobile device 402 may be wirelessly connected to a WLAN 408.

In one example, in response to receiving a request to configure the wireless device 404, the mobile device 402 may determine which WLAN the mobile device 402 is connected to. For example, the mobile device 402 may determine the WLAN by accessing configuration settings that are stored in a database of the mobile device 402 or querying an operating system of the mobile device 402 regarding which WLAN the mobile device 402 is currently connected to. Upon determining that the mobile device 402 is connected to the WLAN 408 and determining that the WLAN 408 is password-protected, the mobile device 402 may prompt a user to provide a password of the WLAN 408. In other instances, the mobile device 402 may determine the password of the WLAN 408 by retrieving the password from a database of the mobile device 402 or querying an operating system of the mobile device 402 (not shown).

As shown in FIG. 4B, upon receiving data indicating an authentication key for the WLAN 408, the mobile device 402 may send wireless configuration data to the wireless device 404, such that the wireless device 404 may be configured to access the WLAN 408.

Figure 5:
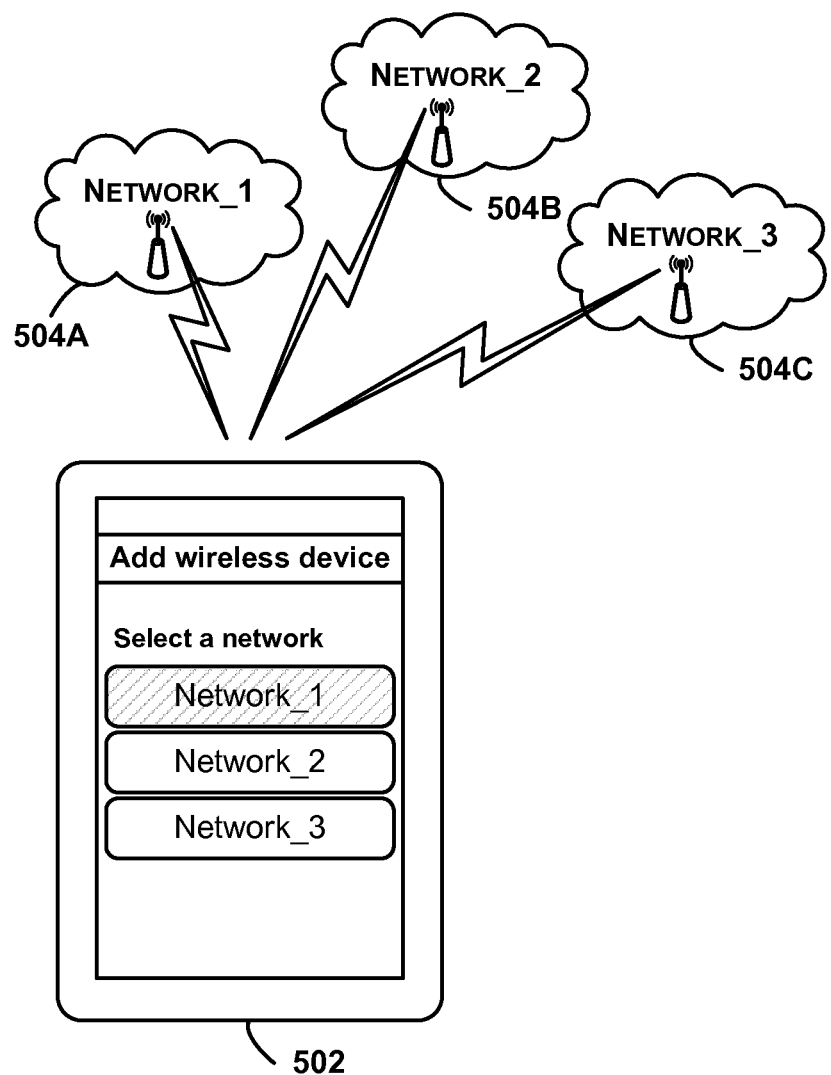
FIG. 5 is a conceptual illustration of an example feature of a mobile device.

In other examples, a mobile device may be configured to provide a user with a list of one or more available WLANs for a wireless device to connect to. FIG. 5 is a conceptual illustration of an example feature of such a mobile device. As shown in FIG. 5, a mobile device 502 may determine that WLANs 504A-504C are available within a wireless range of the mobile device 502. To determine the available WLANs, the mobile device 502 may broadcast one or more probe requests to identify any wireless access points within the wireless range of the mobile device. Wireless access points that receive the probe request may then respond with data identifying the respective WLAN with which there are associated.

The mobile device 502 may then provide a list identifying the WLANs 504A-504C for display. A user may then select a WLAN of the WLANs 504A-504C, and the mobile device 502 may receive data identifying the selected WLAN. Optionally, the mobile device may also prompt a user to provide a password associated with the selected WLAN if the WLAN is determined to be password-protected (not shown).

Figure 6:
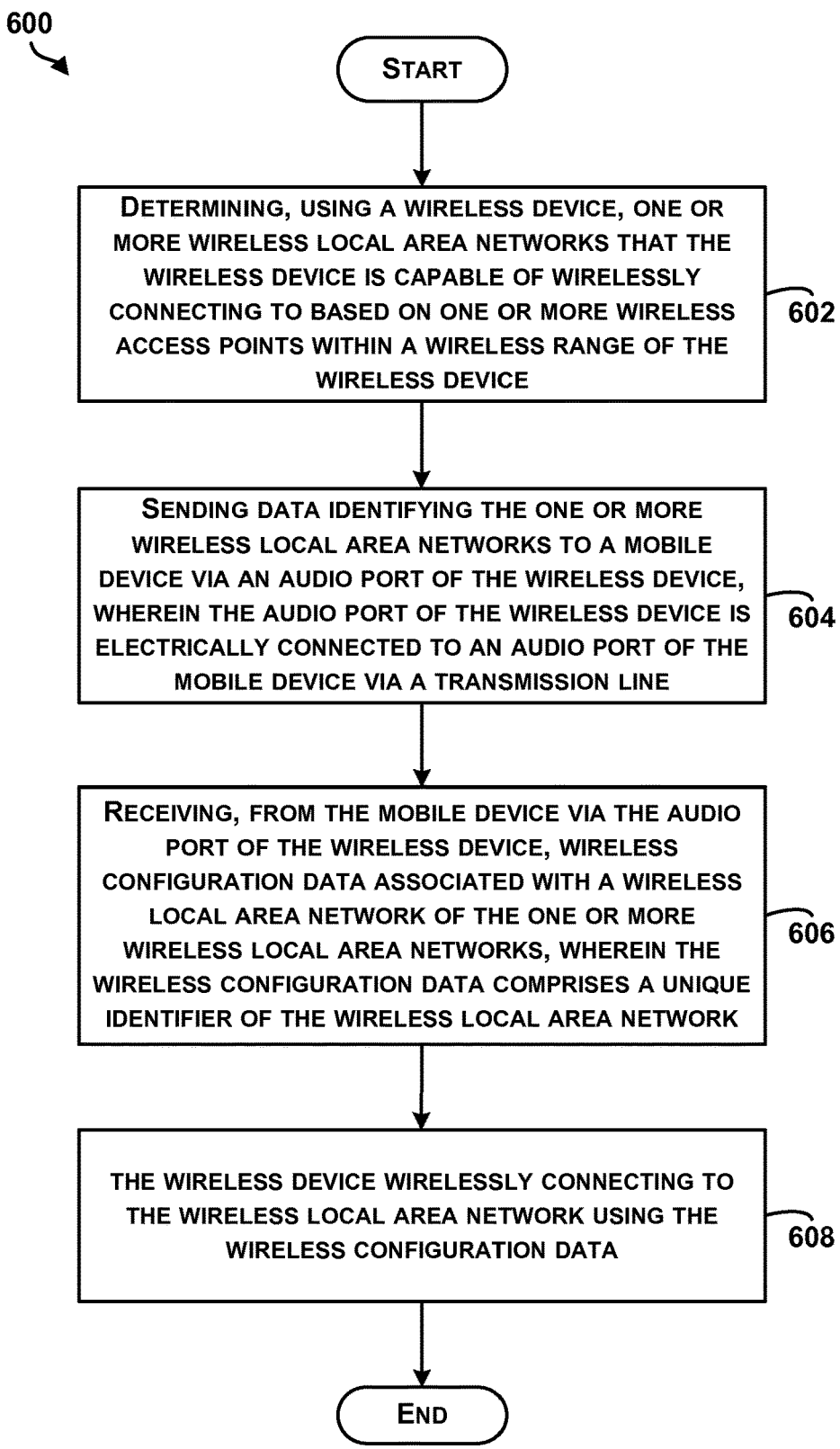
FIG. 6 is a block diagram of another example method for configuring a wireless device.

FIG. 6 is a block diagram of another example method 600 for configuring a wireless device. Method 600 shown in FIG. 6 presents an embodiment of a method that could be used or implemented by the wireless device 104 of FIG. 1, for example, or by components of the wireless device 104 of FIG. 1, or more generally by any computing device. Method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Each block may represent a module, a segment, or a portion of program code, which includes one or more instructions executable by a processor for implementing specific logical functions or steps in the processor. In addition, each block in FIG. 6 may represent circuitry that is wired to perform specific logical functions in the process.

Initially, at block 602, the method 600 includes determining, using a wireless device, one or more wireless local area networks that the wireless device is capable of wirelessly connecting to based on one or more wireless access points within a wireless range of the wireless device. In one example, the wireless device may discover the one or more WLANs by broadcasting one or more probe requests. Upon receiving a probe request, wireless access points of the WLANs may wirelessly communicate information identifying the name of the respective WLAN to the wireless device. In one instance, a user may press a button on the wireless device to trigger the wireless device to discover the one or more WLANs. In another instance, the wireless device may receive data indicating a request to search for one or more WLANs from a mobile device that is electrically connected to the wireless device. For example, an audio port of the mobile device may be electrically connected to an audio port of the wireless device via an audio cable.

At block 604, the method 600 includes sending data identifying the one or more wireless local area networks to a mobile device via an audio port of the wireless device. The audio port of the wireless device may be electrically connected to an audio port of the mobile device via a transmission line. In one example, the wireless device may send the data identifying the one or more WLANs to the mobile device using FSK. However, other digital or analog modulation schemes may also be used by the wireless device. The data identifying the one or more WLANs may include an SSID of each of the WLANs, for example. Optionally, the data identifying the WLANs may also include information indicating whether each of the WLANs is password-protected.

At block 606, the method 600 includes receiving, from the mobile device via the audio port of the wireless device, wireless configuration data associated with a wireless local area network of the one or more wireless local area networks. The wireless configuration data may include a unique identifier of the WLAN. For example, the unique identifier may be a service set identifier (SSID) of the WLAN. In some examples, the wireless configuration data may also include an authentication key for encrypted data transmission between the wireless device and the WLAN. For example, the authentication key may be a Wired Equivalent Privacy (WEP) key, Wi-Fi Protected Access (WPA) key, WPA2 key, etc.

At block 608, the method 600 includes the wireless device wirelessly connecting to the wireless local area network using the wireless configuration data. For example, in response to receiving the wireless configuration data, the wireless device may send an authentication request to a wireless access point of the WLAN. The form of the authentication request may vary, depending on whether the wireless configuration data includes an authentication key. Once authentication is complete, the wireless device may associate with the wireless access point to gain access to the WLAN. If the wireless device successfully associates with the WLAN, the wireless access point may respond by sending a status code to the wireless device that indicates that the wireless device is connected to the WLAN.

Optionally, the method 600 may further involve the wireless device sending a configuration status to the mobile device via the transmission line. The configuration status may indicate whether the wireless device was able to connect to the WLAN. If the wireless device was unable to connect to the WLAN, the configuration status may also include an error message that is indicative of a cause of the failed connection. In another example, the method 600 may further involve the wireless device providing a visual or audible indication of whether the wireless device is connected to the WLAN.

Figure 7A:
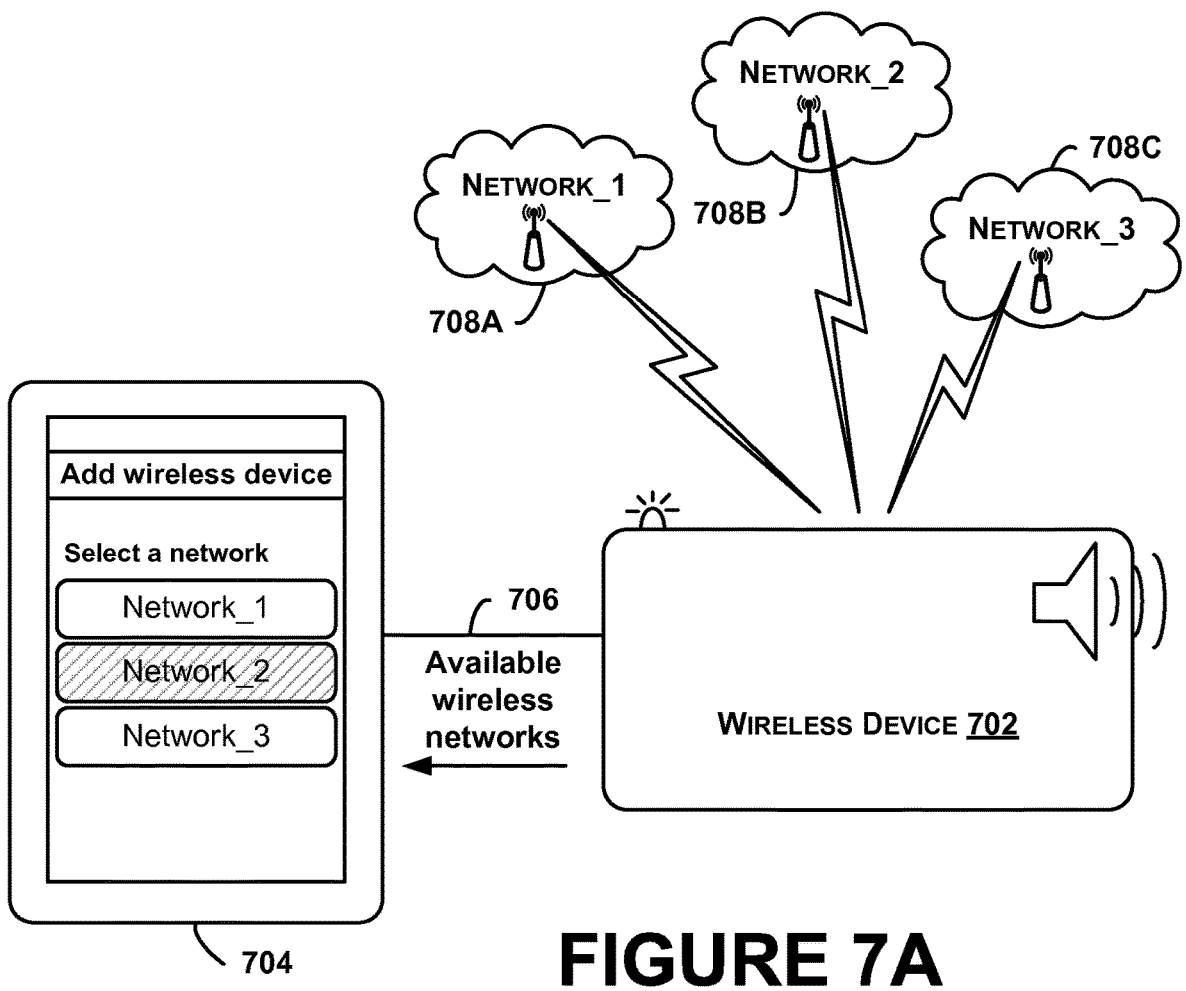
FIGS. 7A-7C are conceptual illustrations of example functions that may be performed by a wireless device.
Figure 7B:
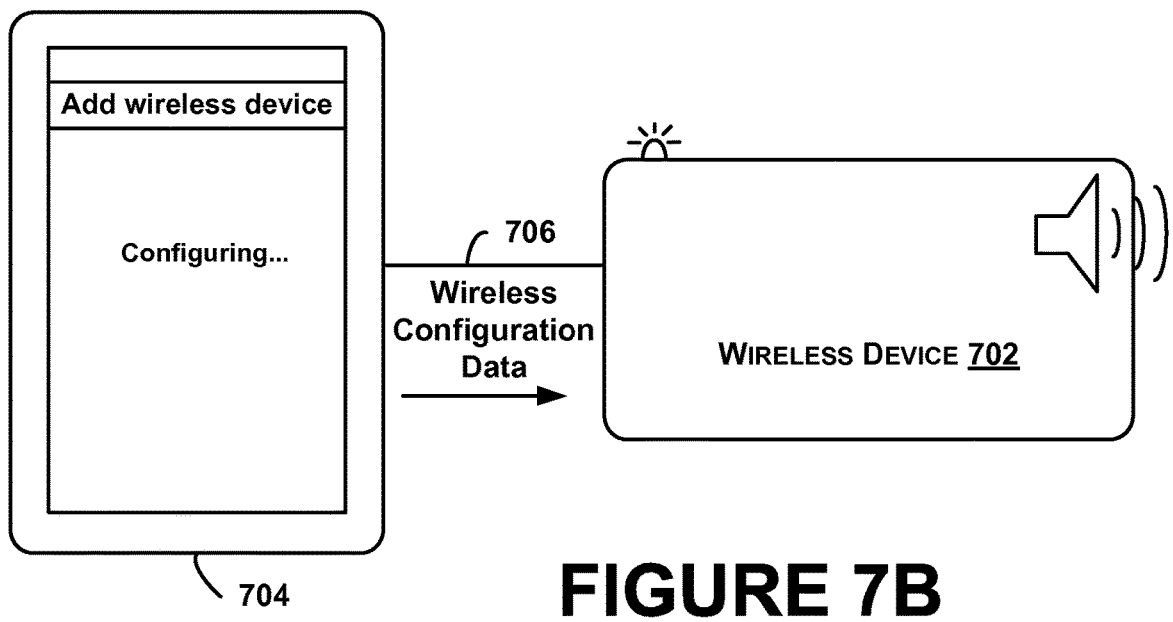
Figure 7C:
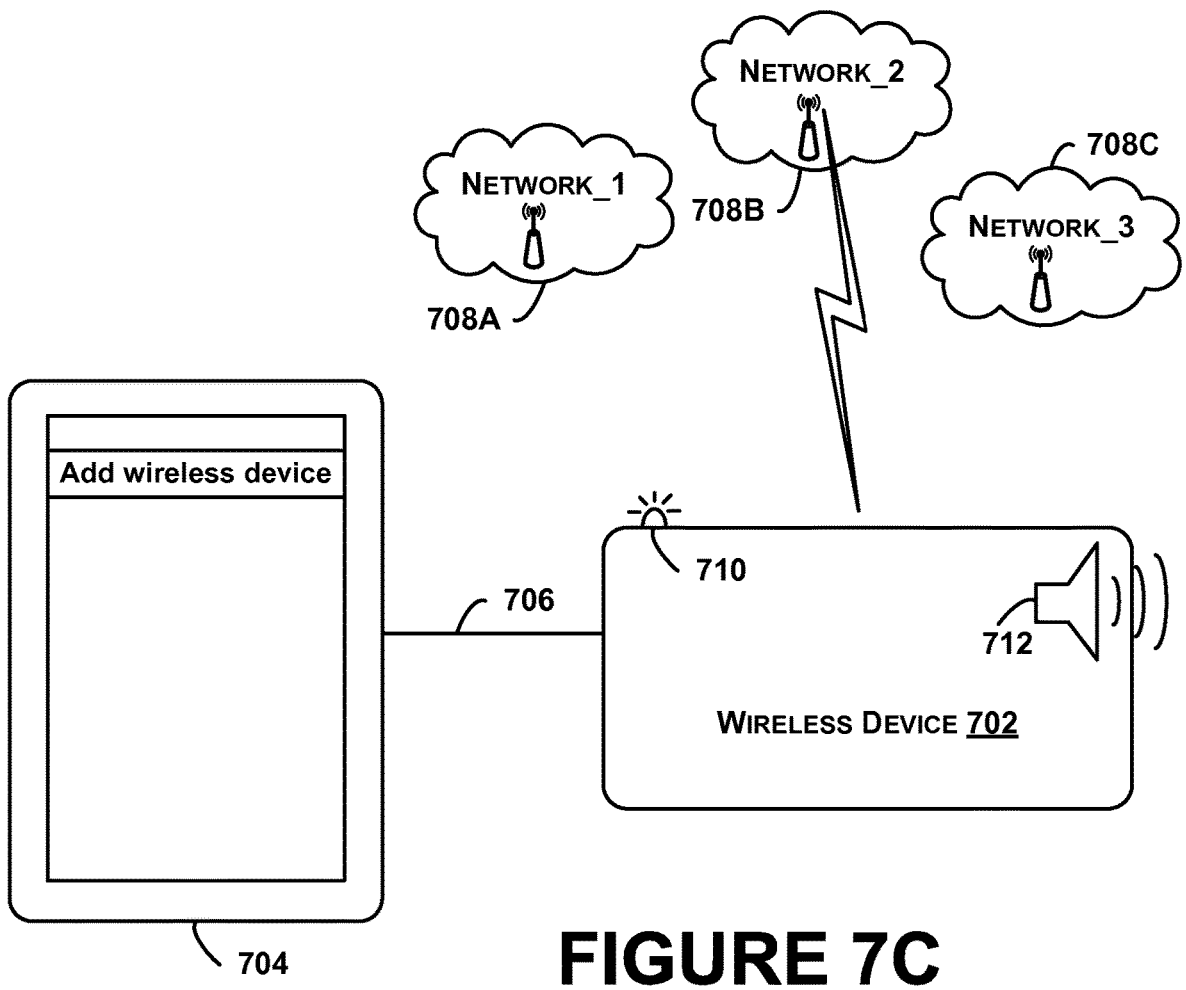

FIGS. 7A-7C are conceptual illustrations of example functions that may be performed by a wireless device 702. In one instance, the functions may be performed by a wireless device 702 that is executing the method 600 of FIG. 6. In FIGS. 7A-7C, the wireless device 702 is shown electrically connected to a mobile device 704 via an audio cable 706.

As shown in FIG. 7A, the wireless device 702 may identify one or more WLANs 708A-708C that are within a wireless range of the wireless device. The wireless device may then send data identifying the WLANs 708A-708C to the mobile device 704.

As shown in FIG. 7B, the wireless device 702 may receive wireless configuration data via the audio cable 706. As an example, the wireless configuration data may include a unique identifier (e.g., SSID) of one of the WLANs 708A-708C as well as an authentication key associated with the WLAN.

As shown in FIG. 7C, the wireless device 702 may be configured to connect to the WLAN 708B using the wireless configuration data. The wireless device 702 may also be configured to provide an audible and/or visual indication of the configuration status of the wireless device 702. For instance, the wireless device 702 may be configured to cause a light-emitting diode (LED) 710 to illuminate when the wireless device is wirelessly connected to the WLAN 708B. For example, the wireless device may cause the LED 710 to illuminate a first color if the wireless device is connected to the WLAN 708B and cause the LED 710 to illuminate a second color if the wireless device is not connected to the WLAN 708B. As another example, the wireless device 702 may be configured to cause a speaker 712 to play a particular beep, tone, tune, or voice recording that is indicative of whether the wireless device 702 is connected to the WLAN 708B.

Figure 8:
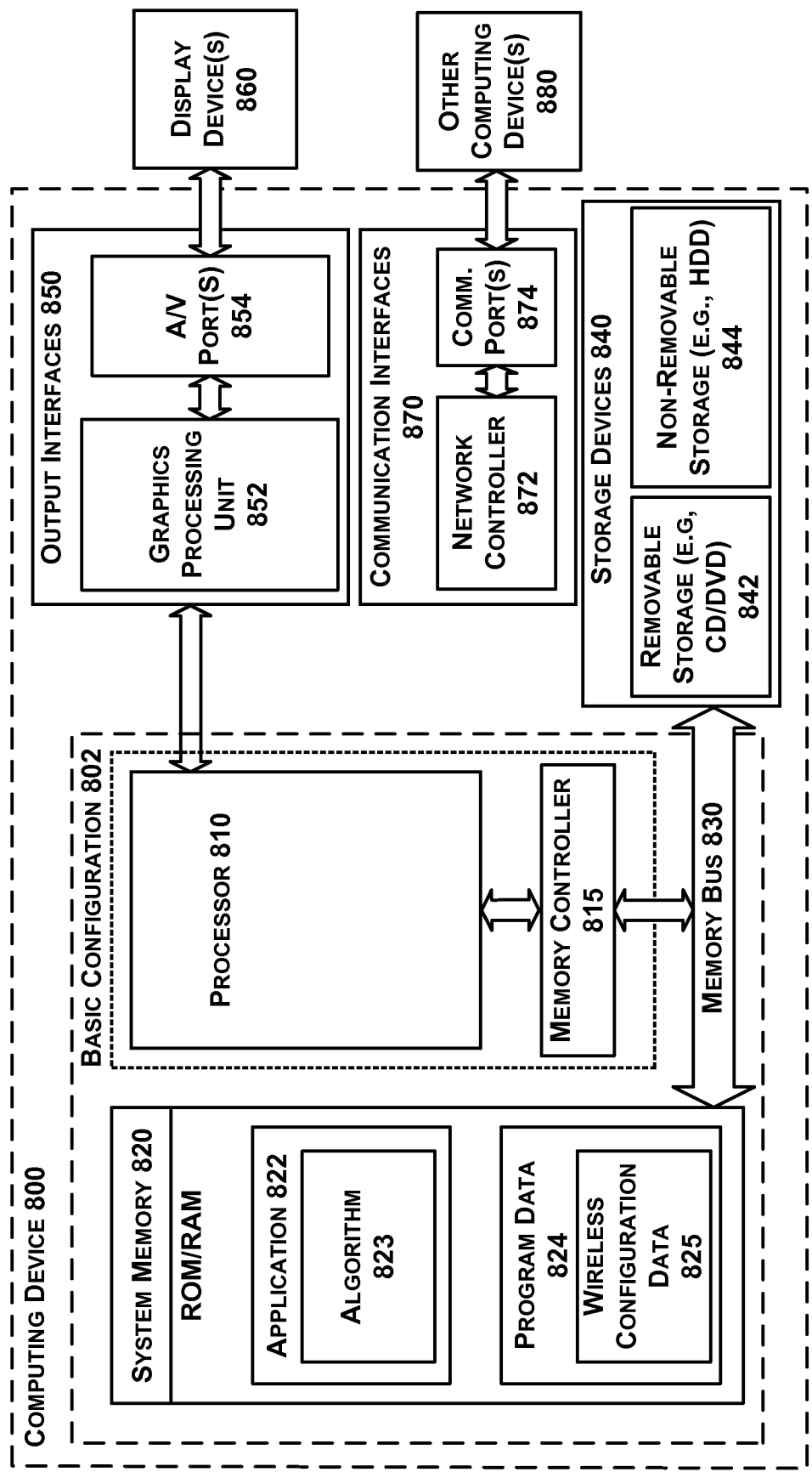
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device 800 may be implemented to configure a wireless device for connecting to a wireless local area network or perform any of the functions described above with reference to FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include an algorithm 823 that is arranged to access one or more configuration settings and select one or more location-determination components, in accordance with the present disclosure. Program data 824 may include wireless configuration data 825 that could be directed to any number of types of data. For instance, application 822 may execute an algorithm to configure a wireless device for accessing a wireless local area network. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more AN ports 854 or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer, including both laptop computer and non-laptop computer configurations, or a server.

Figure 9:
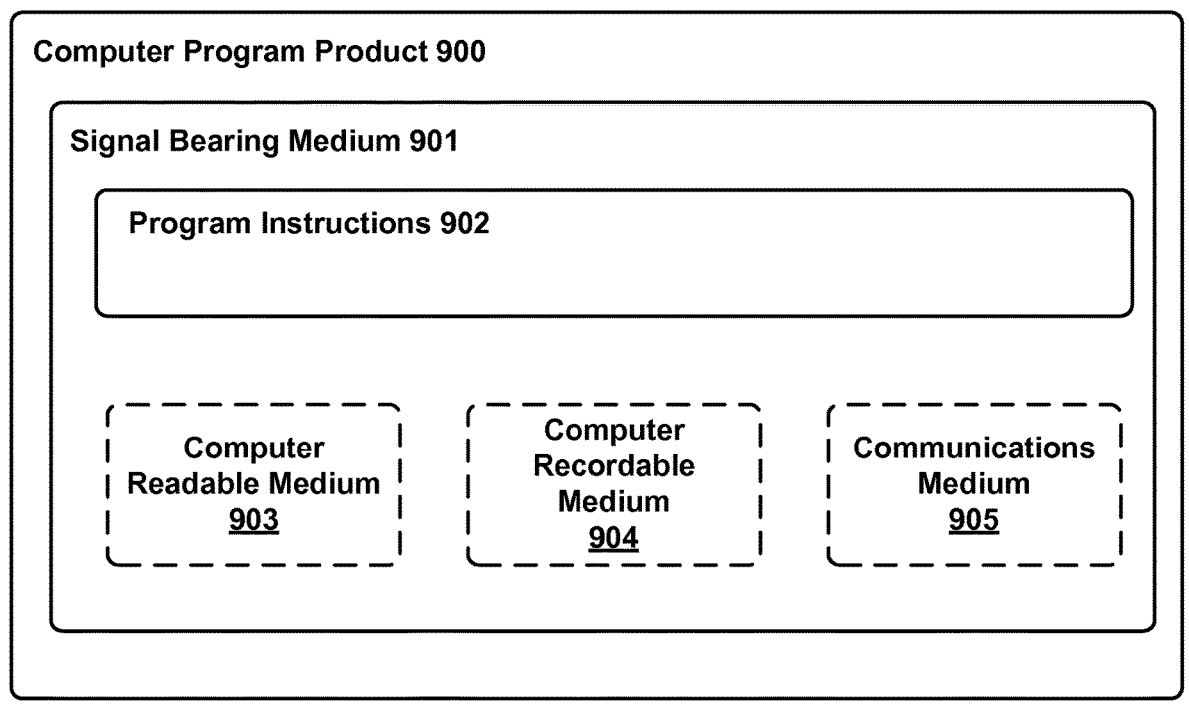
FIG. 9 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming to the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer-readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, using a mobile device configured to wirelessly connect to a wireless local area network (WLAN) via a wireless access point of the WLAN, wireless configuration data associated with the WLAN, wherein the wireless configuration data comprises a unique identifier of the WLAN; and
   sending the wireless configuration data to a wireless device via an audio port of the mobile device;
   further comprising receiving, from the wireless device and via the audio port of the mobile device, a configuration status of the wireless device, wherein the configuration status is indicative of whether the wireless device is wirelessly connected to the WLAN,
   wherein the audio port of the mobile device is electrically connected to an audio port of the wireless device via a transmission line and the access point is configured to connect the WLAN to a wired network, and
   wherein when the configuration status is indicative that the wireless device is not wirelessly connected to the WLAN, the configuration status comprises an error message, wherein the error message provides an indication of why the wireless device is unable to connect to the WLAN.

2. The method of claim 1, wherein the wireless configuration data further comprises an authentication key for encrypted data transmission between the wireless device and the wireless access point of the WLAN.

3. The method of claim 1, wherein the mobile device is configured to wirelessly connect to the WLAN via the wireless access point, and wherein determining the wireless configuration data associated with the WLAN comprises determining wireless configuration data used by the mobile device to wirelessly connect to the wireless access point of the WLAN.

4. The method of claim 3, wherein the wireless configuration data associated with the WLAN work further comprises an authentication key for encrypted data transmission between the wireless access point and the wireless device, and wherein determining the wireless configuration data associated with the WLAN further comprises: requesting, via an interface of the mobile device, the authentication key associated with the WLAN; and receiving, via the interface of the mobile device, data indicating the authentication key associated with the WLAN.

5. The method of claim 1, further comprising:
   determining one or more available WLANs; and
   providing for display via an interface of the mobile device a list of the one or more available WLANs, and wherein determining the wireless configuration data associated with the WLAN comprises receiving, via the interface of the mobile device, data indicating a selection of the WLAN from among the list of the one or more available WLANs.

6. The method of claim 5, wherein determining the one or more available WLANs comprises determining, using the mobile device, one or more WLANs that the mobile device is capable of connecting to based on one or more wireless access points within a wireless range of the mobile device.

7. The method of claim 5, wherein determining the one or more available WLANs comprises receiving, from the wireless device via the audio port of the mobile device, data identifying one or more WLANs that the wireless device is capable of connecting to based on one or more wireless access points within a wireless range of the wireless device.

8. The method of claim 1, wherein determining the wireless configuration data associated with the WLAN comprises: requesting, via an interface of the mobile device, the unique identifier of the WLAN; and receiving, via the interface of the mobile device, data indicating the unique identifier of the WLAN.

9. The method of claim 1, wherein the unique identifier of the WLAN comprises a service set identifier (SSID).

10. The method of claim 1, further comprising sending the wireless configuration data to the wireless device via the audio port of the mobile device in response to an input provided via an interface of the mobile device.

11. The method of claim 1, wherein the transmission line comprises an audio cable.

12. A mobile device for configuring a wireless device to access a wireless local area network (WLAN), the mobile device comprising:
   an audio port, the audio port configured to electrically connect to an audio port of the wireless device via a transmission line;
   at least one processor; and
   a computer-readable medium, configured to store instructions, that when executed by the at least one processor, cause the mobile device to perform functions comprising:
   determining access point wireless configuration data associated with a wireless access point of the WLAN, wherein the access point wireless configuration data comprises a unique identifier of the WLAN, and sending the access point wireless configuration data to the wireless device via the audio port of the mobile device; and
   receiving from the wireless device and via the audio port of the mobile device, a configuration status of the wireless device, wherein the configuration status is indicative of whether the wireless device is wirelessly connected to the WLAN,
   wherein the access point is configured to connect the WLAN to a wired network, and
   wherein when the configuration status is indicative that the wireless device is not wirelessly connected to the WLAN, the configuration status comprises an error message, wherein the error message provides an indication of why the wireless device is unable to connect to the WLAN.

13. The mobile device of claim 12, wherein determining the access point wireless configuration data associated with the WLAN comprises determining wireless configuration data used by the mobile device to wirelessly connect to the wireless access point of the wireless local area network.

14. The mobile device of claim 12, wherein the functions further comprise: determining one or more available WLANs, and providing for display via an interface of the mobile device a list of the one or more available WLANs, and wherein determining the access point wireless configuration data associated with the WLAN comprises receiving, via the interface of the mobile device, data indicating a selection of the WLAN from among the list of the one or more available WLANs.

15. The mobile device of claim 12, wherein determining the access point wireless configuration data associated with the WLAN comprises:

requesting, via an interface of the mobile device, the unique identifier of the WLAN, and receiving, via the interface of the mobile device, data indicating the unique identifier of the WLAN.

16. The mobile device of claim 12, wherein the access point wireless configuration data further comprises an authentication key for encrypted data transmission between the wireless device and the wireless access point of the WLAN.

17. A method comprising:
determining, using a wireless device, a plurality of WLANs that the wireless device is capable of wirelessly connecting to based on a plurality of wireless access points within a wireless range of the wireless device;
sending data identifying the plurality of WLANs to a mobile device via an audio port of the wireless device, wherein the audio port of the wireless device is electrically connected to an audio port of the mobile device via a transmission line;
receiving, from the mobile device via the audio port of the wireless device, wireless configuration data associated with a WLAN of the plurality of WLANs, wherein the wireless configuration data comprises a unique identifier of the WLAN;
the wireless device wirelessly connecting to the WLAN using the wireless configuration data; and
using the wireless device, an audible or visual indication of a configuration status of the wireless device, wherein the configuration status is indicative of whether the wireless device is wirelessly connected to the wireless local area network and
wherein when the configuration status is indicative that the wireless device is not wirelessly connected to the WLAN, the configuration status comprises an error message, wherein the error message provides an indication of why the wireless device is unable to connect to the WLAN.

18. The method of claim 17, wherein the wireless configuration data further comprises an authentication key for encrypted data transmission between the wireless device and a wireless access point of the WLAN.

* * * * *